United States Patent [19]

Stempeck

[11] Patent Number: 4,571,627
[45] Date of Patent: Feb. 18, 1986

[54] ELECTRONIC VIEWFINDER

[75] Inventor: John W. Stempeck, Reading, Mass.

[73] Assignee: Polaroid Corporation, Cambridge, Mass.

[21] Appl. No.: 667,846

[22] Filed: Nov. 2, 1984

[51] Int. Cl.[4] ............................................. H04N 5/30
[52] U.S. Cl. ................................... 358/224; 358/227; 354/219
[58] Field of Search ............... 358/909, 906, 213, 224, 358/227; 354/219, 220, 221, 222, 223, 224

[56] References Cited

U.S. PATENT DOCUMENTS

| 3,724,349 | 4/1973 | von Belvard | 95/44 R |
| 3,833,758 | 9/1974 | Ferrari | 358/909 |
| 4,087,829 | 5/1978 | Ueda et al. | 354/38 |
| 4,208,115 | 6/1980 | Proske | 354/201 |
| 4,290,686 | 9/1981 | Suzuki et al. | 354/289 |
| 4,299,462 | 11/1981 | Suzuki et al. | 354/53 |
| 4,303,322 | 12/1981 | Someya | 354/31 |
| 4,330,797 | 5/1982 | Yokokawa | 358/224 |
| 4,341,481 | 7/1982 | Krüeger et al. | 354/289 |
| 4,366,501 | 12/1982 | Tsunekawa et al. | 358/310 |
| 4,432,626 | 2/1984 | Ohtake | 354/155 |
| 4,452,522 | 6/1984 | Murakami et al. | 354/289.12 |
| 4,462,025 | 7/1984 | Murakami et al. | 340/753 |

FOREIGN PATENT DOCUMENTS 0097032 12/1983 European Pat. Off. .
2089169 6/1982 United Kingdom .

OTHER PUBLICATIONS

"4.25-in. and 1.51-in. B/W and Full-Color LC Video Displays Addressed by Poly-Si TFTs", by Shinji Morozumi et al., pp. 316-319, SID 84 Digest.
"A 240×360 Element Active Matrix LCD with Integrated Gate-Bus Drivers Using Poly-Si TFTs", by Yasuhisa Oana, pp. 312-315, SID 84 Digest.
National Semiconductor Specification for LM555, pp. 9-33 through 9-38.

Primary Examiner—Gene Z. Rubinson
Assistant Examiner—Robert G. Lev
Attorney, Agent, or Firm—Edward S. Roman

[57] ABSTRACT

An electronic viewfinder for an electronic imaging still camera may be selectively operated in either an electronic viewfinder mode in which electronic image data sensed by the photoresponsive sensing elements of the camera is transmitted to provide a video display of the scene within the field of view of the camera or, alternatively, an optic viewfinder mode in which the image defining scene light rays are optically transmitted for direct viewing of the scene within the field of view of the camera by the camera operator. The optic viewfinder mode of operation is automatically initiated during the time in which the image defining data is transmitted from the image sensing elements to the image data storing elements and the viewfinder is inoperative to provide its video display.

15 Claims, 3 Drawing Figures

ELECTRONIC VIEWFINDER

BACKGROUND OF THE INVENTION

1. Field of the Invention

This invention relates generally to an electronic viewfinder and camera and, more particularly, to an electronic viewfinder for use with an electronic imaging still camera wherein the viewfinder may provide an image of the scene either electronically or optically.

2. Description of the Prior Art

Electronic imaging still cameras have been proposed with electronic viewfinders in which the image data sensed by the camera is directed to a video display for viewing by the camera user or operator. The camera user may compose or frame the scene of which he desires to make a still recording of by viewing the screen of a video display to which image data is transferred directly from the camera's image sensing elements. In this manner, the camera user views the exact scene to be recorded in the way that the user of a single lens reflex camera is able to view the scene to be recorded directly through the camera's lens.

One disadvantage to the electronic viewfinder in an electronic imaging still camera occurs during the time in which the camera actually records the image data and is unable to simultaneously provide the image data to operate the video display of the viewfinder. The transmission of data from the image sensing element of the electronic imaging still camera for recording on a memory element requires a finite amount of time during which the electronic viewfinder is inoperative and thus the camera user is unable to tell what may be happening in the scene for this finite length of time which may be in the order of 0.1 to 1 seconds.

Therefore, it is a primary object of this invention to provide an electronic viewfinder for an electronic imaging still camera wherein the viewfinder may be operated in an electronic viewing mode during the time required for the camera user to frame and compose a scene to be photographed and in an optic viewing mode during the time required to transmit image data from the image sensing elements to the image recording elements.

It is a further object of this invention to provide an electronic viewfinder for an electronic imaging still camera in which the user may selectively operate the viewfinder in either an electronic viewing mode in which image data sensed by the camera's image sensing elements are transmitted to provide a video display of the scene to the camera user or an optic viewing mode in which the viewer may directly view the scene through optically transmissive elements.

Other objects of the invention will in part be obvious and will in part appear hereinafter. The invention accordingly comprises the mechanism and system possessing the construction, combination of elements and arrangement of parts which are exemplified in the following detailed disclosure.

SUMMARY OF THE INVENTION

One embodiment of an electronic viewfinder is provided for an electronic imaging still camera of the type comprising a photoresponsive scene light sensing device for converting incident image defining scene light rays to electronic signal information and means for recording electronic signal information. The electronic viewfinder comprises an electrically alterable light modulator stationed to receive incident image defining scene light rays from the field of view defined by the camera. The light modulator operates to transmit such received image defining light rays for direct viewing by the camera user upon actuation of the light modulator into a light transmissive mode of operation. An electronically actuatable visual or video display provides a visual display of an image defined by the electronic signal information input thereto. Optic means operate to direct the image defining light rays from the display and the scene light transmitted by the light modulator to a common area for viewing by the camera user. A control operates to either actuate the light modulator to operate in its light transmissive mode while simultaneously deactivating the video display so as not to provide its visual display or deactivating the light modulator to operate in a scene light blocking mode while simultaneously activating the video display so as to provide its visual display.

In an alternative embodiment, the electronic viewfinder comprises an electrically alterable light modulator viewable by the camera user and stationed to receive incident image defining scene light rays from the field of view defined by the camera. The light modulator is controlled to operate in either a visual display mode of operation to provide a visual display of an image defined by the electronic signal information input thereto or a light transmissive mode to operate to transmit such incident image defining scene light rays for viewing by the camera user.

DESCRIPTION OF THE DRAWINGS

The novel features that are considered characteristic of the invention are set forth with particularity in the appended claims. The invention itself, however, both as to its organization and method of operation together with other objects and advantages thereof will be best understood from the following description of the illustrated embodiment when read in connection with the accompanying drawings wherein:

DESCRIPTION OF THE PREFERRED EMBODIMENT

Figure 1:
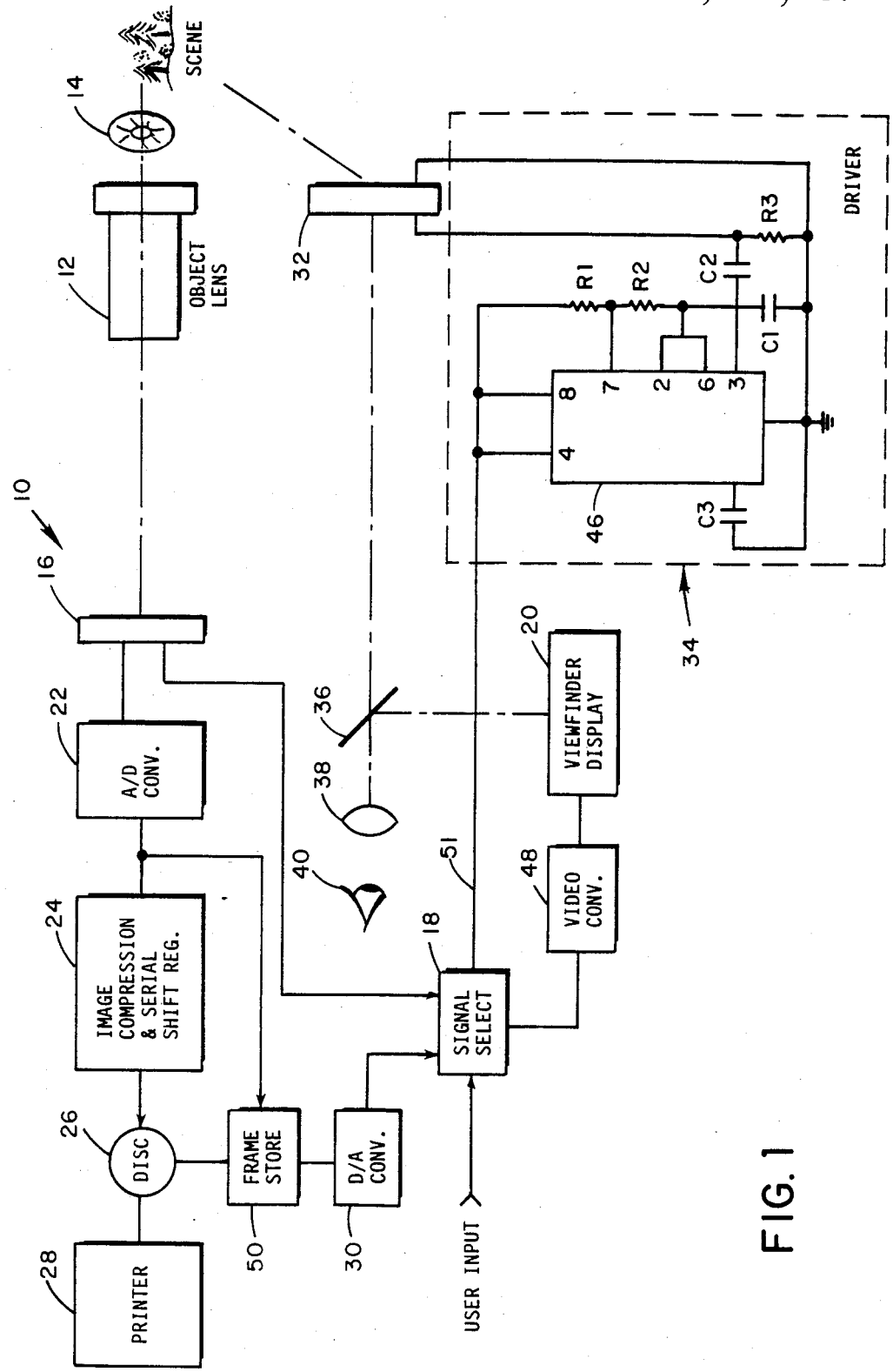
FIG. 1 is a schematic view of an electronic imaging still camera embodying the electronic viewfinder of this invention.

Referring now to FIG. 1, there is shown generally at 10 an electronic imaging still camera embodying the electronic viewfinder of this invention comprising an objective lens 12 for focusing an image of a scene to be recorded through a shutter 14 onto a focal plane comprising a two-dimensional image sensing array 16 which may be a charge coupled device (CCD) or any other conventional electronic image sensing device such as a photodiode array or Vidicon. The image sensing array 16 preferably comprises a predetermined number of discrete image sensing areas or pixels arranged in vertical columns and horizontal rows wherein each column is superposed by either a green, red or blue filter arranged in a well-known manner. The transfer of image data from the image sensing areas of the CCD array 16 may be accomplished in any well-known manner by serial shift registers (not shown) clocked from a central clock (also not shown).

The image data from the two-dimensional image sensing array 16 is directed to both an analog-to-digital converter 22 and a signal select circuit 18 for reasons which will become apparent from the following discussion. The analog format of the image data transferred from the two-dimensional image sensing array 16 is converted to a digital format by the analog-to-digital converter 22 and thereafter directed by way of an image compression and serial shift register circuit 24 for recording on a disk memory 26. The image data recorded on the disk memory 26 may thereafter be directed in a well-known manner to a printer 28 in order to provide a still photographic print of the image data stored by the disk memory 26. The image data from the disk memory 26 may also be directed by way of a frame store circuit 50 and digital-to-analog converter 30 to a signal select circuit 18.

The electronic viewfinder of this invention is provided for the electronic imaging still camera 10 and comprises an electrically alterable light modulator stationed to receive incident image defining scene light rays from the field of view generally defined by the camera objective lens 12. The electrically alterable light modulator 32 in its preferred embodiment comprises a two-dimensional liquid crystal display (LCD) which may be electrically altered to operate in either a generally transmissive mode or a generally light blocking mode. Although a liquid crystal display is shown as the preferred light modulator, it will be well understood that the scope of this invention is by no means so limited and other two-dimensional electrically alterable light modulators such as the Litton iron garnet magneto-optic spatial light modulator might also be utilized. The incident image defining scene light rays transmitted through the light modulator 32 are directed by way of a half-silvered mirror 36 toward an eyelens 38 so that an image of a scene may be viewed in real time by the camera user's eye as shown at 40.

The light modulator 32 may be driven between its light transmissive and light blocking modes of operation by a driver circuit 34 controlled from the signal select circuit 18 in a manner to be subsequently described herein. The electronic viewfinder further comprises a viewfinder display 20 for providing a visual or video display which is also directed by way of the half-silvered mirror 36 for viewing at the eyelens 38 by the camera user. The viewfinder display 20 may comprise either a cathode ray tube (CRT) or an active matrix liquid crystal display (LCD) which responds to any standard video format input signal such as RS170 provided from a video converter circuit 48.

The electronic imaging still camera is first operated in a so-called preview mode during which time the user or photographer composes and frames the scene to be ultimately recorded. During this preview mode, the shutter 14 is opened and an image of the scene is focused by the lens 12 onto the plane of the image sensing array 16 so as to provide a charge pattern corresponding to the analog image data. During this preview mode, the camera user may choose to view the scene electronically by way of the viewfinder display 20 or optically by way of the light modulator 32. In the event that the user chooses to preview the scene electronically by way of the viewfinder display 20, he may actuate the camera to set the signal select circuit 18 to direct the image data from the image sensing array 16 to the video converter circuit 48 from whence it is converted to a standard video format to input the viewfinder display 20 and provide an electronic image of the scene being framed and composed. The signal select circuit 18 simultaneously provides a zero DC voltage by way of a line 51 to deactivate the driver circuit 34 and thereby, in turn, cause the light modulator 32 to operate in its scene light blocking mode of operation. In this manner scene light which might otherwise be transmitted by the light modulator 32 to the half-silvered mirror 36 is blocked so as not to diminish the quality of the image provided by the viewfinder display 20. The viewfinder display 20 may also be connected in a well-known manner to provide alpha-numerical displays indicative of such things as scene lighting conditions, camera focus or strobe readiness to better aid the camera user.

The light modulator driver circuit 34 may comprise an astable multivibrator circuit such as an LM 555 manufactured by National Semiconductor connected by capacitors $C_1$ through $C_3$ and resistors $R_1$ through $R_3$ to provide an output squarewave to the light modulator 32 wherein the output squarewave preferably has a frequency in the order of 500 hertz to 3 kilohertz. This LCD driving squarewave is provided by first charging the capacitor $C_1$ by way of the resistors $R_1$ and $R_2$ from a positive DC voltage provided by way of the line 50 from the signal sheet circuit 18. The voltage across the capacitor $C_1$ charges to a selected value so as to trigger the astable circuit 46 to switch and thereafter discharge the capacitor $C_1$ through the resistor $R_1$. In this manner, there is developed a saw tooth signal which is subsequently squared in a well-known manner to provide the aforementioned output driver squarewave at pin 3 of the astable multivibrator circuit 46. The output signal from the astable multivibrator 46 is coupled to the light modulator 32 by way of the capacitor $C_2$ to isolate the light modulator 32 from any DC voltage which could be potentially damaging to the liquid crystal display. The driver circuit 32 herein described is conventional and well known to the art and may be replaced by a conventional microprocessor having a 1 kilohertz output squarewave signal.

Conversely, if the camera user wishes to optically preview the scene, he may actuate the camera by way of the signal select circuit 18 to interrupt the transfer of the image data from the image sensing array 16 to the viewfinder display 20 by way of the video converter 48 while simultaneously providing the positive DC voltage signal to the driver circuit 34 thereby, in turn, providing the aforementioned squarewave driver signal to the light modulator 32. In this manner, the light modulator 32 is operated in its scene light transmitting mode to direct the incident scene light by way of the half-silvered mirror 36 to the eyelens 38 for viewing by the camera user. Since the viewfinder display is turned off, the camera user views the scene which he wishes to frame and compose optically by way of the eyelens 38, half-silvered mirror 36 and light modulator 32. As will be readily understood, if the light modulator 32 is an active matrix LCD, then it may also be connected in the aforementioned manner to provide alpha-numerical displays helpful to the camera user.

When the camera user has composed and framed the desired scene to be recorded, he can initiate a recording of the desired scene on the disk memory 26 in the usual manner by operating the camera in its record mode of operation whereby the shutter 14 is closed and a transfer of image data from the image storing array 16 to the disk memory 26 by way of the A/D converter 22 and image compression and serial shift register 24 is commenced. Image data cannot be simultaneously transferred from the image sensing array 16 in the aforementioned manner for recording on the image memory disk 26 and at the same time be transferred by way of the signal select circuit 18 and video converter 48 for viewing on the electronic viewfinder display 20. Thus as is well known, the viewfinder display 20 becomes inoperative and unable to provide a visual display when the electronic camera 10 is operated in its record mode of operation regardless of whether the user had previously composed and framed the scene electronically by way of the viewfinder display 20 or optically by way of the light modulator 32. Thus the signal select circuit 18 automatically responds to the electronic camera 10 being operated in its record mode by providing a positive DC voltage drive signal along line 51 to activate the drive circuit 34 to provide its output squarewave drive signal and thereby operate the light modulator 32 in its light transmissive mode. In this manner, the camera user may still continue to view the scene optically through the light modulator 32 even while it is being recorded and the viewfinder display 20 rendered inoperative. Alternatively, the signal select circuit 18 may be actuated to transfer image data representative of the image frame sensed immediately prior to the initiation of the record operation from the frame store circuit 50 to the video display 20. The viewfinder display 20 will thus provide an electronic image of the scene immediately prior to recording while the light modulator 32 is activated to operate in its light blocking mode as previously described. However, as will be appreciated, this viewfinder display 20 does not provide the camera user with any indication of how the scene changes during the time required to record the image data in contrast to the optical viewfinder mode of operation.

After the image data has been recorded in the aforementioned manner, the user or photographer may wish to again review the scene which he has just recorded to insure that it is framed and composed in the desired manner before making a still photographic print. Toward this end, the electronic camera 10 may be operated in a review mode whereby the digitized image data stored on the disk memory 26 may be transferred by way of the digital-to-analog converter 30, signal select circuit 18 and video converter circuit 48 to the viewfinder display 20. Thus, the camera user may view the scene previously recorded as displayed on the viewfinder display 20. Simultaneous to this review operation, the signal select circuit 18 interrupts the DC output signal to the driver circuit 34 thereby terminating the drive signal to the light modulator 32 so as to operate the light modulator 32 in its scene light blocking mode. In this manner, the viewfinder display 20 provides a visual display of the scene previously recorded while the light modulator 32 blocks any scene light which might otherwise diminish or degrade the image viewable from the viewfinder display 20.

Figure 2:
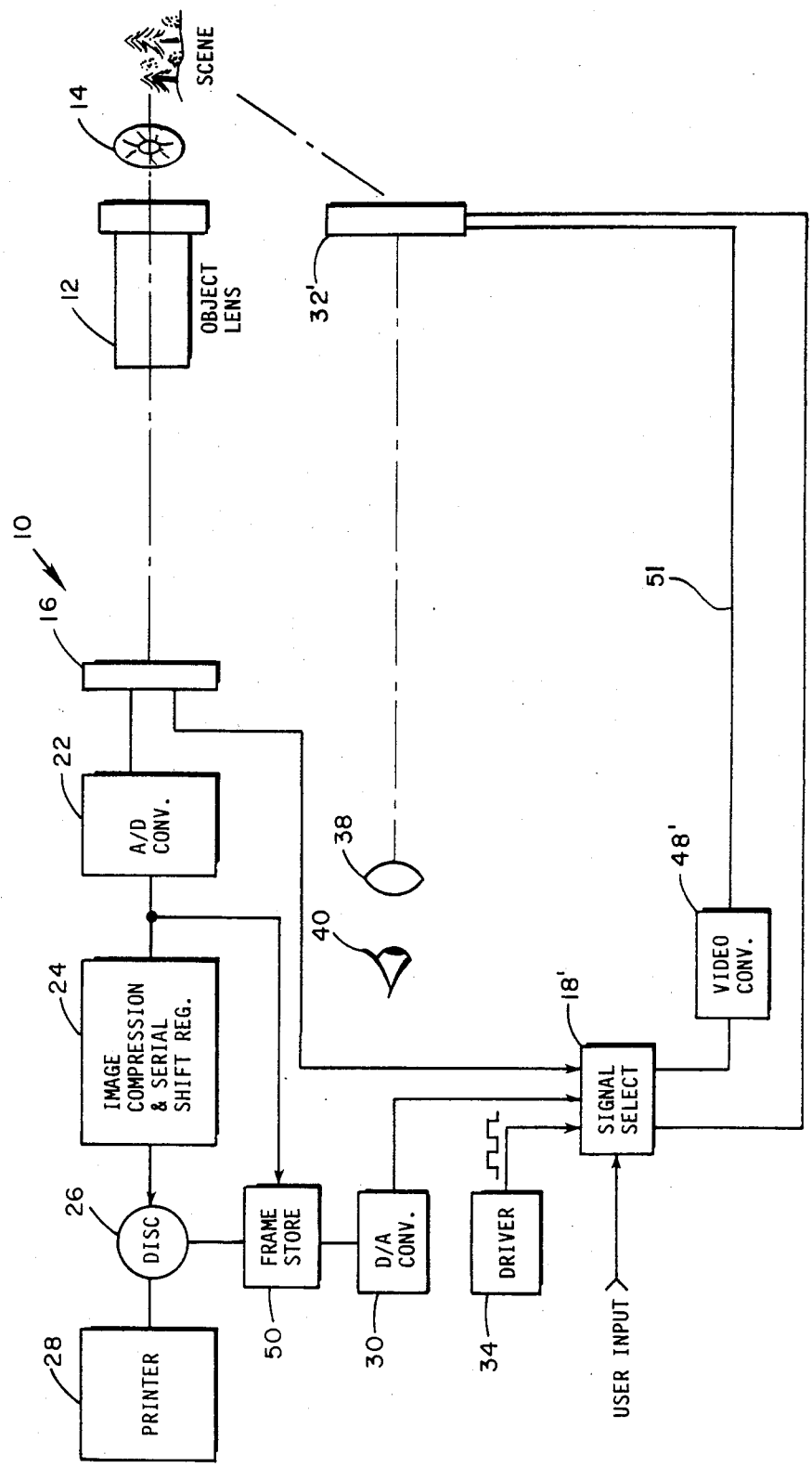
FIG. 2 is a schematic view of an alternate embodiment of the electronic viewfinder and camera of FIG. 1.

Referring now to FIG. 2 where like numerals refer to previously-described components, there is shown an alternate embodiment at 10' for the electronic camera of FIG. 1 wherein the viewfinder has been simplified to include an electrically alterable light modulator 32' of the type in which every pixel has an associated onboard driver transistor which can be actively matrix addressed. This active matrix LCD display 32' may now not only be operated in a light transmissive or light blocking mode, but may also be operated in a visual display mode to provide the actual visual display provided by the viewfinder display 20 in the aforementioned embodiment of FIG. 1. Thus when the electronic camera 10' is operated in its aforementioned preview mode of operation, the camera user may select to view the scene either electronically in which case the light modulator 32' is operated in its visual display mode or optically in which case the light modulator 32' is operated in its scene light transmissive mode. The camera user may thus activate the electronic camera 10' during its preview mode of operation to electronically view the scene by actuating the signal select circuit 18' to transfer the image data from the image sensing array 16 by way of the video converter 48' to the light modulator 32' to provide the electronic visual display. Conversely, the camera user may elect to view the scene optically in which case the aforementioned squarewave drive signal from the driver circuit 34 is directed by way of the signal select circuit 18' to operate the light modulator 32' in its light transmissive mode.

Again, the light modulator 32' may also be connected in the aforementioned manner to provide alpha-numerical displays helpful to the camera user. During the operation of the electronic camera 10' in its record mode as previously described, the signal select circuit 18' automatically transfers the aforementioned squarewave driver signal from the driver circuit 34 to operate the light modulator 32' in its light transmissive mode to enable the camera user to optically view the scene, since as previously described he is unable to electronically view the scene. Alternatively, the signal select circuit 18' may be actuated to transfer image data representative of the image frame sensed immediately prior to the record operation from the frame store circuit 50 to the light modulator 32' so as to operate the light modulator 32' in its visual display mode. Again, in this mode of operation, the light modulator 32' cannot provide the camera user with any indication of how the scene changes during the record operation in contrast to the aforementioned optical viewfinder mode of operation.

As previously discussed, the electronic camera 10' may thereafter be operated in a review mode of operation wherein the signal select circuit 18' transfers the image data received from the disk memory 26 by way of the digital-to-analog converter 30 to the video converter circuit 48' from whence it is converted to appropriate signals for driving the light modulator 32' in its visual display mode of operation as previously discussed.

Figure 3:
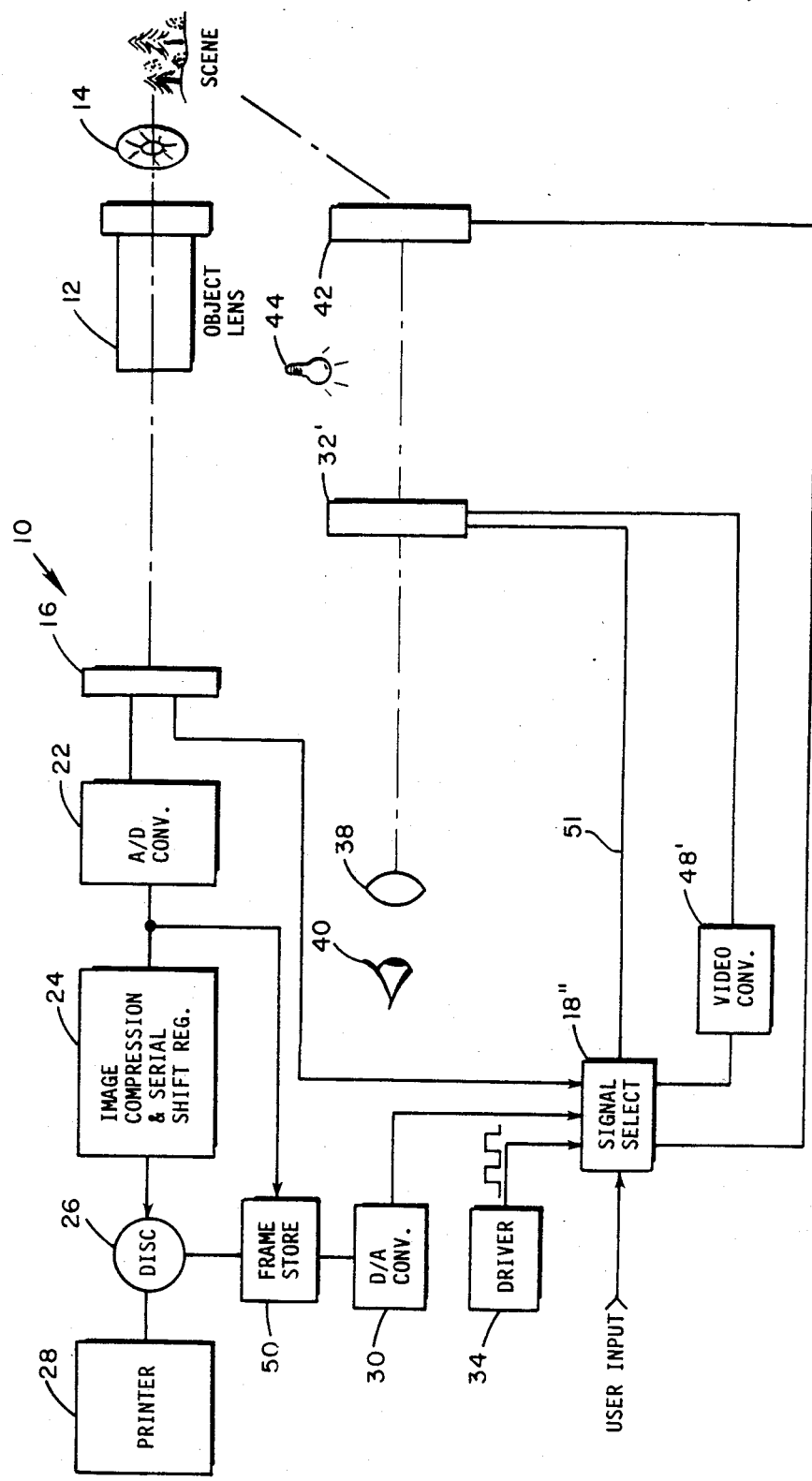
FIG. 3 is a schematic diagram of still another embodiment of the electronic viewfinder and camera of FIG. 1.

Referring now to FIG. 3 where like numerals reference previously described elements, there is shown still another embodiment at 10" for the electronic camera and viewfinder of this invention wherein there is included a second electrically alterable light modulator 42 in optical alignment forward of the first light modulator 32' so as to first receive the incident image defining scene rays. A source of artificial illumination 44 is also disposed between the first and second light modulators 32' and 42. During camera operation in its aforementioned preview mode, the user may again elect to view the scene being framed and composed electronically by activating the camera so that the signal select circuit 18" transfers image data from the image sensing array 16 by way of the video converter circuit 48' to the light modulator 32' so as to operate the light modulator in its aforementioned visual display mode. Simultaneous to this, the signal select circuit 18" interrupts the aforementioned squarewave driver signal to the second light modulator 42 so as to operate it in its scene light blocking mode of operation thereby blocking the transfer of any incident scene light which might otherwise operate to degrade or diminish the visual display provided by the light modulator 32'. Simultaneously, the source of artificial illumination 44 disposed between the light modulators 32' and 42 is also turned on to uniformly back light the visual display provided by the light modulator 32'. Conversely, if the camera user elects to optically view the scene during the framing and composing mode of operation of the camera, he may activate the camera to set the signal select circuit 18" to transfer the aforementioned squarewave driver signals from the driver circuit 34 to the light modulators 32' and 42 in order to operate them in their aforementioned light transmitting modes of operation. Again, the light modulator 32' may also be connected in the aforementioned manner to provide alpha-numerical displays helpful to the camera user.

During the camera record mode of operation, the signal select circuit 18" is again actuated to transfer the aforementioned squarewave drive signals from the driver circuit 34 to the light modulators 32' and 42 so as to again operate them in their light transmitting mode to enable the camera user to optically view the scene during the record time in which the scene cannot be viewed electronically. Alternatively, the signal select circuit 18" may be actuated to transfer image data representative of the image frame sensed immediately prior to the record operation from the frame store circuit 50 to the light modulator 32' so as to operate the light modulator 32' in its visual display mode. Simultaneously, the signal select circuit 18" interrupts the aforementioned squarewave driver signal to the second light modulator 42 so as to operate it in its scene light blocking mode of operation while also turning off the source of artificial illumination. Again, when operated in this mode the light modulator 32' cannot provide the camera user with any indication of how the scene changes during the record operation in contrast to the aforementioned optical viewfinder mode of operation.

The subsequent review mode may be initiated by actuating the signal select circuit 18" to transfer the image data from the disk memory 26 by way of the digital-to-analog converter 30 and video converter 48' to the light modulator 32' to provide the electronic visual display. Simultaneously, the signal select circuit 18" interrupts the transfer of the squarewave driver signal from the driver circuit 34 to the light modulator 42 so as to operate it in its scene light blocking mode of operation while simultaneously turning on the source of artificial illumination 44. In this manner, the light modulator 32' can provide an electronic visual display of the previously recorded image while the light modulator 42 blocks any incident scene light from degrading or diminishing the visual image.

Since certain changes may be made in the abovedescribed system and apparatus without departing from the scope of the invention herein involved, it is intended that all matter contained in the description thereof or shown in the accompanying drawings shall be illustrative and not in a limiting sense.

What is claimed is:

1. An electronic viewfinder for an electronic imaging camera of the type comprising a photoresponsive scene light sensing device for converting incident image defining scene light rays to electronic signal information and means for recording the electronic signal information, said electronic viewfinder comprising:
   an electrically alterable light modulator stationed to receive incident image defining scene light rays from the field of view defined by the camera, and transmitting such received image defining light rays for viewing by the camera user upon actuation of said light modulator into a light transmissive mode of operation;
   electronically actuatable visual display means for providing a visual display of an image defined by electronic signal information input thereto;
   optic means for directing the image defining light rays from said display means and the scene light transmitted by said light modulator to a common area for viewing by the camera user; and
   control means for either actuating said light modulator to operate in its said light transmissive mode while simultaneously deactivating said visual display means so as not to provide its visual display or deactivating said light modulator to operate in a scene light blocking mode while simultaneously activating said visual display means so as to provide its said visual display.

2. The viewfinder of claim 1 wherein said control means may be selectively actuated to drive said visual display means with electronic signal information derived either from the camera image sensing device to provide the user with a visual display of the scene within the camera's field of view at that instant or from previously recorded image defining electronic signal information to provide the user with a visual display of a scene previously recorded by the camera during which time said light modulator remains deactivated to remain in a scene light blocking mode.

3. The viewfinder of claim 2 wherein said control means responds to the actuation of the electronic imaging camera to record a select scene image by activating said light modulator to operate in its said light transmissive mode while said visual display means is deactivated so as not to provide said visual display for a select time interval generally corresponding to the time required for the electronic camera to record the selected scene image.

4. The viewfinder of claim 3 wherein said control means may be actuated to operate said visual display in its electronic visual display mode while said light modulator is operated in its scene light blocking mode to provide for a select time interval generally corresponding to the time required for the electronic camera to record the selected scene image, an image of the scene sensed immediately prior to said record operation.

5. The viewfinder of claim 1 wherein said light modulator comprises a liquid crystal display (LCD).

6. The viewfinder of claim 2 wherein said optic means includes a mirror having one side thereof in optical alignment to receive the image defining light rays transmitted by said light modulator and the other side thereof in optical alignment to receive the image defining light rays emanating from said visual display, said mirror operating to direct the image defining light rays received from said visual display means and said light modulator to said common area for viewing by the camera user.

7. An electronic viewfinder for an electronic imaging camera of the type comprising a photoresponsive scene light sensing device for converting incident image defining scene light rays to electronic signal information and means for recording the electronic signal information, said electronic viewfinder comprising:

an electrically alterable light modulator viewable by the camera user and stationed to receive incident image defining scene light rays from the field of view defined by the camera; and control means for controlling said light modulator to operate in either a visual display mode of operation to provide a visual display of an image defined by electronic signal information input thereto or a light transmissive mode of operation to transmit such incident image defining scene light rays for viewing by the camera user.

8. The viewfinder of claim 7 wherein said control means may be selectively actuated to drive said light modulator with electronic signal information derived either from the camera image sensing device to provide the user with a visual display of the scene within the camera's field of view at that instant or from previously recorded image defining electronic signal information to provide the user with a visual display of a scene previously recorded by the camera.

9. The viewfinder of claim 8 further comprising a second electrically alterable light modulator in optical alignment forward of said first light modulator so as to first receive the incident image defining scene light rays and a source of artificial illumination disposed between said first and second light modulators, wherein said control means controls said second light modulator to operate in a light transmissive mode and said source of illumination to be turned off when said first light modulator is operated in its said light transmissive mode, said second light modulator being further controlled to operate in a light blocking mode and said source of illumination being turned on when said first light modulator is operated in its visual display mode.

10. The viewfinder of claim 9 wherein said control means responds to the actuation of the electronic imaging camera to record a select scene image by actuating said first light modulator to operate in its light transmitting mode while simultaneously turning off said source of artificial illumination and controlling said second light modulator to operate in its light transmitting mode for a select time interval generally corresponding to the time required for the electronic camera to record the selected scene image.

11. The viewfinder of claim 10 wherein said control means may be actuated to operate said first light modulator in its electronic visual display mode while said second light modulator is operated in its scene light blocking mode and said source of artificial illumination is turned on to provide for a select time interval generally corresponding to the time required for the electronic camera to record the selected scene image, an image of the scene sensed immediately prior to said record operation.

12. The viewfinder of claim 9 wherein said first light modulator comprises an active matrix liquid crystal display.

13. The viewfinder of claim 7 wherein said control means responds to the actuation of the electronic imaging camera to record a select scene image by actuating said light modulator to operate in its said light transmitting mode for a select time interval generally corresponding to the time required for the electronic camera to record the selected scene image.

14. The viewfinder of claim 13 wherein said control means may be actuated to operate said light in its electronic visual display mode to provide for a select time interval generally corresponding to the time required for the electronic camera to record the selected scene image, an image of the scene sensed immediately prior to said record operation.

15. The viewfinder of claim 7 wherein said light modulator comprises an active matrix liquid crystal display.

* * * * *